Aug. 14, 1934.　　　R. SOUTTER, JR　　　1,969,764
ELECTRICAL APPARATUS
Filed Feb. 27, 1933
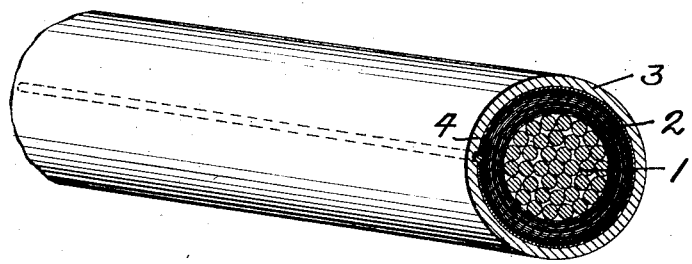
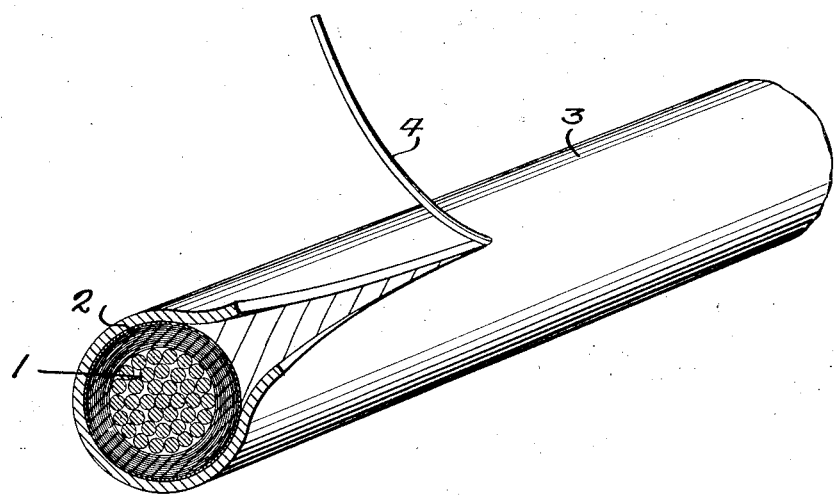
INVENTOR.
Robert Soutter, Jr.
BY
Kiddle, Margeson and Harridge
ATTORNEYS.

UNITED STATES PATENT OFFICE 1,969,764

ELECTRICAL APPARATUS

Robert Soutter, Jr., Nutley, N. J., assignor to The Okonite-Callender Cable Company, Incorporated, Paterson, N. J., a corporation of New Jersey Application February 27, 1933, Serial No. 658,688

2 Claims. (Cl. 247—3)

My invention relates to an improvement in electrical apparatus for the transmission of high tension electrical energy.

The copending application of Charles E. Bennett, Serial No. 553,714, filed July 29, 1931 discloses a cable system for the transmission of high tension electrical energy in which the impregnated paper insulated cable conductors are installed in a pipe which is eventually filled with oil under high pressure, and the present invention is directed to a cable structure which is particularly well adapted for such an installation and to a method to be used in connection with installing that type of cable.

More specifically the present invention contemplates oil impregnation of the cable at the factory and shipment of the impregnated cable to the job sealed in a temporary lead sheath, this temporary lead sheath, which protects the insulation of the cable against injury in transit and against moisture absorption, being removed as the cable is installed in its pipe or conduit.

In accordance with the present invention one or more piano wire rip cords is fed with the cable through the lead press during the application of the temporary soft metal protecting sheath to the insulated cable at the factory to provide one or more rip cords beneath the protecting temporary impermeable soft metal sheath intermediate this soft metal sheath and the oil filled paper insulation of the cable.

On installation, as the cable is pulled into its pipe, the rip cord or cords is pulled rearwardly to rip the soft metal sheath lengthwise of the cable thereby permitting of the continuous removal of the soft metal sheath as the cable advances into its conduit or pipe.

In the drawing accompanying this application:

Fig. 1 is a view showing a piece of cable constructed in accordance with the present invention; and Fig. 2 is a view showing the method employed in accordance with the present invention of removing the lead sheath.

Referring to the drawing in detail, my improved cable comprises a conductor 1 shown as of the stranded type. 2 designates the oil filled or impregnated laminated paper insulation of the conductor.

On the outside of the cable is a temporary soft metal protecting sheath such as lead designated 3, while intermediate this sheath and the paper insulation 2 is a metal rip cord 4 extending longitudinally of the cable. It will be understood that more than one rip cord may be employed if desired.

As above pointed out, the cable is impregnated at the factory and sealed, the temporary sheath 3 fully protecting the cable against injury in transit and against the entry of moisture.

The cable in this condition is shipped to the installation site and during installation as the cable is drawn into its conduit or pipe the rip cord or cords 4 is pulled rearwardly as illustrated in Fig. 2 to part or divide the temporary sheath 3 continuously lengthwise of the cable so that the sheath is removed as the cable goes forward into its conduit.

This application is a continuation in part of my copending application Serial No. 596,478, filed March 3, 1932.

What I claim is:—

1. In an electric cable structure the combination of a cable conductor, oil filled laminated insulation about the same, a temporary soft metal sheath about the insulation for protecting the cable prior to installation, and a metal rip cord directly beneath the sheath for dividing or parting the said temporary soft metal sheath longitudinally of the cable to facilitate removal of said sheath from the oil filled laminated insulation of the cable during installation of the cable.

2. The method which comprises enclosing an insulated cable conductor, and a wire lying along the outside of the insulation of the cable and extending lengthwise of the cable, in a temporary soft metal impermeable sheath, impregnating the cable with liquid insulation and sealing, removing the temporary sheath by exerting tension on the wire to part or divide the temporary sheath lengthwise of the cable while moving the insulated impregnated cable thus unsheathed forward into a pipe.

ROBERT SOUTTER, JR.